(12) United States Patent
Matsumura et al.

(10) Patent No.: US 7,514,143 B2
(45) Date of Patent: Apr. 7, 2009

(54) RE-PEELABLE PRESSURE-SENSITIVE ADHESIVE SHEET

(75) Inventors: Takeshi Matsumura, Ibaraki (JP); Kouji Akazawa, Ibaraki (JP); Kazuyuki Kiuchi, Ibaraki (JP); Tomokazu Takahashi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/912,615

(22) Filed: Aug. 5, 2004

(65) Prior Publication Data
US 2005/0031861 A1   Feb. 10, 2005

(30) Foreign Application Priority Data
Aug. 8, 2003 (JP) ............... 2003-206670

(51) Int. Cl.
B32B 7/12 (2006.01)
B05D 5/10 (2006.01)
(52) U.S. Cl. ............ 428/354; 428/343; 428/41.7; 428/41.8; 427/208.4
(58) Field of Classification Search ......... 428/354, 428/345, 343, 355 AC, 40.1, 41.5; 156/247, 156/250, 272.2
See application file for complete search history.

(56) References Cited

U.S. PATENT DOCUMENTS

| | | | |
|---|---|---|---|
| 5,538,771 A * | 7/1996 | Nakayama et al. | 428/41.3 |
| 6,506,490 B1 * | 1/2003 | Yamamoto | 428/343 |
| 6,524,701 B1 * | 2/2003 | Kondo et al. | 428/355 RA |
| 6,878,441 B2 * | 4/2005 | Kondo et al. | 428/355 RA |
| 2003/0064579 A1 | 4/2003 | Miyakawa et al. | |
| 2003/0104199 A1 | 6/2003 | Kondo et al. | |
| 2004/0000370 A1 * | 1/2004 | Kiuchi et al. | 156/77 |
| 2004/0003883 A1 * | 1/2004 | Kiuchi et al. | 156/77 |
| 2004/0126575 A1 * | 7/2004 | Yoshida et al. | 428/343 |

FOREIGN PATENT DOCUMENTS

| | | |
|---|---|---|
| CN | 1254743 A | 5/2000 |
| CN | 1411037 A | 4/2003 |
| JP | 6-322338 | 11/1994 |
| JP | 2000-355678 | 12/2000 |
| JP | 2002-246345 | 8/2002 |

OTHER PUBLICATIONS

Herrnring, J "Machining and Chemical treatment semiconductor wafer using adhesive film for cushioning and protecting main surface from chemical attack", Derwent Abstract Of DE 3040675A, May 6, 1982.*
Jorg, Herrnring, "Method for the Processing of Semiconductor Disks", English Translation of DE 3040675, Jun. 5, 1982.*
Office Action issued on the corresponding Chinese Patent Application No. 2004100564566, dated Mar. 2, 2007.

* cited by examiner

*Primary Examiner*—D. Lawrence Tarazano
*Assistant Examiner*—Anish Desai
(74) *Attorney, Agent, or Firm*—Knobbe Martens Olson & Bear LLP

(57) ABSTRACT

The re-peelable pressure-sensitive adhesive sheet of the invention is a re-peelable pressure-sensitive adhesive sheet, which comprises an adhesive layer formed over a base film, and which further comprises at least one intermediate layer between the base film and the adhesive layer, the intermediate layer having a storage elastic modulus (G') of $3.0 \times 10^4$ to $1.0 \times 10^8$ Pa at 23° C. and a storage elastic modulus (G') of $1.0 \times 10^3$ to $8.0 \times 10^4$ Pa at 200° C.

13 Claims, 1 Drawing Sheet

RE-PEELABLE PRESSURE-SENSITIVE ADHESIVE SHEET

FIELD OF THE INVENTION

The present invention relates to a re-peelable pressure-sensitive adhesive sheet, a process for producing a semiconductor element, using the re-peelable pressure-sensitive adhesive sheet, and a semiconductor element obtained by this production process. The re-peelable pressure-sensitive adhesive sheet of the present invention is useful as a wafer-working pressure-sensitive adhesive sheet. For example, the sheet is useful as a protective sheet used to protect the front surface of a semiconductor wafer in the step of grinding the rear surface of the wafer in the process for producing various semiconductors, a pressure-sensitive adhesive sheet for fixation and support, which is adhered to the rear surface of a semiconductor wafer in the dicing step of cutting/dividing the wafer into small element pieces and then collecting the small element pieces automatically in a picking-up manner, or some other sheet. These pressure-sensitive adhesive sheets are peeled after the working of the wafer.

BACKGROUND OF THE INVENTION

Before a semiconductor wafer is patterned (or in a pre-process), the wafer has a constant thickness in order to make the handling thereof easy. On the other hand, after the patterning of the wafer (or in a post-process), the wafer is subjected to the step of grinding the rear surface of the wafer mechanically so as to thin the wafer into a given thickness and further the step of cutting the thinned wafer into chips. Generally, in this post-process, the semiconductor wafer is subjected to the respective working-steps in the state that a pressure-sensitive adhesive sheet is adhered to (or laminated on) the wafer in order to protect the patterned surface of the wafer in the wafer-thinning step or fix and support the thinned wafer in the step of cutting the thinned wafer. In particular, in the case that the semiconductor wafer is worked to be thin and subsequently the rear surface of the wafer is subjected to etching treatment or sputtering or vapor-depositing treatment or in the case that a die bond film is adhered to the wafer, the wafer is heated to a temperature of about 100 to 200° C. in the state that the a protective sheet is adhered to the wafer.

In recent years, the tendency that semiconductor wafers are made large-sized or made thin for the use thereof as IC cards or others has been advancing. However, the semiconductor wafers made large-sized or thin are largely warped by heat in the wafer-thinning step or in a heating environment, so that the wafers may easily be damaged. Consequently, there are caused problems such that the semiconductor wafers cannot be put into carrying cassettes; the wafers are cracked when they are carried or adhesive sheets are peeled therefrom; and the patterned surfaces thereof are damaged (see Japanese Patent Application Laid-Open (JP-A) Nos. 6-322338 and 2000-355678).

SUMMARY OF THE INVENTION

An object of the present invention is to provide a re-peelable pressure-sensitive adhesive sheet which comprises an adhesive agent layer formed on a base film and makes it possible that even when the sheet and a semiconductor wafer are adhered to each other and they are placed, as they are, in a heating environment, the wafer can be prevented from being warped. Another object of the present invention is to provide a process for producing a semiconductor element, using the re-peelable pressure-sensitive adhesive sheet; and a semiconductor element obtained by this production process.

The inventors have made eager investigations to solve the above-mentioned problems. As a result, it has been found out that the following re-peelable pressure-sensitive adhesive sheet makes it possible to attain the above-mentioned objects. Thus, the present invention has been made.

That is, the present invention relates to a re-peelable pressure-sensitive adhesive sheet, comprising an adhesive agent layer formed over a base film, and at least one intermediate layer between the base film and the adhesive agent layer, wherein, the intermediate layer has a storage elastic modulus (G') of $3.0 \times 10^4$ to $1.0 \times 10^8$ Pa at 23° C. and a storage elastic modulus (G') of $1.0 \times 10^3$ to $8.0 \times 10^4$ Pa at 200° C.

The inventors have considered that a main cause of the generation of warps in a wafer in a heating step is that the pressure-sensitive adhesive sheet itself, which is adhered to the wafer, thermally contracts largely. In light of the consideration, the re-peelable pressure-sensitive adhesive sheet of the present invention is made up to a sheet wherein an intermediate layer having the above-mentioned given storage elastic modulus (G') is formed between a base film and an adhesive agent layer. This intermediate layer makes the following possible: thermal contraction stress in the base film is relieved; and when the wafer and the sheet are placed in a heating environment, warps in the wafer are largely decreased. As a result, it is possible to solve problems such that the wafer is cracked and carry out a wafer-working process smoothly and continuously.

The storage elastic modulus (G') of the intermediate layer is from $3.0 \times 10^4$ to $1.0 \times 10^8$ Pa at 23° C. When the storage elastic modulus (G') at 23° C. is within this range, there does not arise a problem that when the re-peelable pressure-sensitive adhesive sheet is adhered to a semiconductor wafer, the intermediate layer is stuck out to pollute the wafer and devices such as a laminating roller. Thus, good laminating (or adhering) workability can be kept. The storage elastic modulus (G') of the intermediate layer at 23° C. is preferably from $5.0 \times 10^4$ to $5.0 \times 10^7$ Pa, more preferably from $5.0 \times 10^4$ to $5.0 \times 10^6$ Pa.

The storage elastic modulus (G') of the intermediate layer at 200° C. is from $1.0 \times 10^3$ to $8.0 \times 10^4$ Pa. When the storage elastic modulus (G') at 200° C. is within this range, thermal contraction stress in the base film is sufficiently relieved and further warps in the semiconductor wafer can be largely decreased. The storage elastic modulus (G') of the intermediate layer at 200° C. is preferably from $1.0 \times 10^3$ to $5.0 \times 10^4$ Pa, more preferably from $1.0 \times 10^3$ to $2.0 \times 10^4$ Pa.

The intermediate layer in the re-peelable pressure-sensitive adhesive sheet can be made of an organic viscoelastic body. The gel fraction of the organic viscoelastic body is preferably 40% or less by weight in order to form the intermediate layer having the above-mentioned storage elastic modulus (G'). The gel fraction of the organic viscoelastic body is more preferably from 10 to 40% by weight, even more preferably from 20 to 30% by weight.

The intermediate layer in the re-peelable pressure-sensitive adhesive sheet can be made of a thermoplastic resin. The melting point of the thermoplastic resin, which is based on differential thermal analysis, is preferably 70° C. or lower in order to form the intermediate layer having the above-mentioned storage elastic modulus (G'). The melting point of the thermoplastic resin is preferably from 40 to 70° C., more preferably from 40 to 60° C.

In the re-peelable pressure-sensitive adhesive sheet, the base film is preferably a film made of a material having a glass transition temperature (Tg) of 70° C. or higher and a melting point of 200° C. or higher, the melting point being based on differential thermal analysis.

Since the intermediate layer in the re-peelable pressure-sensitive adhesive sheet of the present invention relieves thermal contraction of the base film in a heating environment, the kind of the base film is not particularly limited and the film is allowed to be thermally deformed in some extent. However, if the base film is deformed to such a degree that the flatness or smoothness thereof is largely damaged, the wafer is largely warped so that the wafer may be cracked. A preferable example of the base film which does not cause such problems is a film made of a material having a glass transition temperature of 70° C. or higher and a melting point of 200° C. or higher. The glass transition temperature is from 70 to 180° C., preferably from 100 to 180° C. The melting point is from 200 to 300° C., preferably from 220 to 280° C.

In the re-peelable pressure-sensitive adhesive sheet, the base film is preferably a film having a heating contraction percentage of 2% or less. The coefficient is obtained when the film is kept at 200° C. for 2 hours.

The use of this film, which has a heating contraction percentage of 2% or less, as the base film in the re-peelable pressure-sensitive adhesive sheet of the invention makes it possible to make the dimensional change of the base film very small even when the film is placed into severe heating conditions. As a result, even when the sheet and a semiconductor wafer are adhered to each other and they are placed, as they are, in a heating environment of, e.g., about 100 to 200° C. temperature, the semiconductor wafer can be prevented from being warped. About the heating contraction percentage of the base film, each of the heating contraction percentages thereof in the MD and TD directions is preferably 2% or less, more preferably 1.5% or less, even more preferably 1.0%. As the value is smaller, better results are obtained.

The present invention also relates to a process for producing a semiconductor element, which comprises the step of working a semiconductor wafer in the state that the above-mentioned re-peelable pressure-sensitive adhesive sheet is adhered to the semiconductor wafer; and a semiconductor element obtained by this production process.

BRIEF DESCRIPTION OF THE DRAWING

Additional objects of the present invention, and characteristics and superior points thereof will be sufficiently understood on the basis of the following description. Advantageous effects of the present invention will also be apparent from the following description which refers to the attached drawing.

DESCRIPTION OF THE EMBODIMENTS

Figure 1:
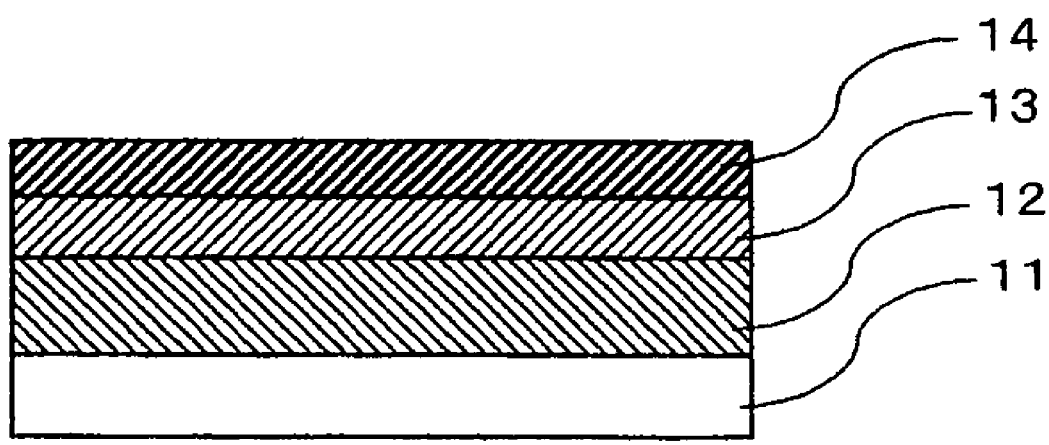
FIG. 1 is a sectional view of a pressure-sensitive adhesive sheet for dicing.

Hereinafter, the re-peelable pressure-sensitive adhesive sheet of the invention is described in detail with reference to FIG. 1.

As illustrated in FIG. 1, in a re-peelable pressure-sensitive adhesive sheet of an example of the present invention, an adhesive agent layer 13 is formed beyond an intermediate layer 12 on a base film 11. The sheet has at least one intermediate layer 12. In FIG. 1, the sheet has an intermediate layer 12. The sheet has, on the adhesive agent layer 13, a separator 14, which is a member that may be formed if necessary. In FIG. 1, the sheet has the adhesive agent layer on one of the surfaces of the base film 11. However, adhesive agent layers may be formed on both the surfaces of the base film 11.

The re-peelable pressure-sensitive adhesive sheet may be wound to be made into a tape form.

As the material of the base film, various materials may be used without any especial limitation. Examples thereof include polyolefins such as low density polyethylene, linear polyethylene, middle density polyethylene, high density polyethylene, ultra-low density polyethylene, randomly-copolymerized polypropylene, block-copolymerized polypropylene, homo-polypropylene, polybutene and polymethylpentene, ethylene-vinyl acetate copolymer, ionomer resin, ethylene-(meth)acrylic acid copolymer, ethylene-(meth)acrylic acid ester (random or alternate) copolymer, ethylene-butene copolymer, ethylene-hexene copolymer, polyurethane, polyesters such as polyethylene terephthalate and polyethylene naphthalate, polycarbonate, polyimide, polyetheretherketone, polyimide, polyetherimide, polyamide, entirely aromatic polyamide, polyphenylsulfide, aramide (paper), glass, glass cloth, fluorine-contained resin, polyvinyl chloride, polyvinylidene chloride, cellulose-based resin, silicone resin, and metal (foil), and paper.

As described above, it is preferable to use, as the material of the base film, a material having a glass transition temperature (Tg) of 70° C. or higher and a melting point of 200° C. or higher, or a material having a heating contraction percentage of 2% or less. Examples of such a material of the base film include polyesters such as polyethylene terephthalate and polyethylene naphthalate, polycarbonate, polyimide, polyetherimide, polyamide, entirely aromatic polyamide, polyphenylsulfide, aramide (paper), glass, glass cloth, fluorine-contained resin, silicone resin, and metal (foil), and paper.

The material of the base film may be a polymer such as a crosslinked body of any one of the above-mentioned resins. The base film may be used in the state that the film is not drawn or is subjected to monoaxial or biaxial drawing as the occasion demands. If necessary, the surfaces of the base film may be subjected to a conventional physical or chemical treatment such as matting treatment, corona discharge treatment, primer treatment, or crosslinking treatment (chemically crosslinking treatment with silane).

The material of the base film may be one which is appropriately selected from materials as described above. If necessary, a blend of several materials belonging to same or diverse category may be used. The base film may be a mono-layered structure or a multi-layered structure having two or more layers. When the adhesive agent layer is of a radial ray curable type, a material at least portion of which can transmit a radial ray, such as an X-ray, an ultraviolet ray or an electron beam, is used.

The thickness of the base film is usually from 5 to 1000 μm. The thickness is preferably from 7 to 500 μm, more preferably from 10 to 100 μm from the viewpoint of the workability of the film for cutting or other works.

As the material which forms the intermediate layer, a material having the above-mentioned storage elastic modulus and having a function for relieving stress generated when the film is heated is used without any especial limitation. This material, which forms the intermediate layer, may be an organic viscoelastic body or a thermoplastic resin. An organic viscoelastic body is particularly preferable since molecules thereof can widely be designed and the productivity thereof is high. A rubber type or acrylic type organic viscoelastic body is more preferable.

Examples of the rubber type organic viscoelastic body include rubber polymers such as natural rubber, polyisobutylene rubber, styrene-butadiene rubber, styrene-isoprene-styrene block copolymer rubber, reclaimed rubber, butyl rubber, polyisobutylene rubber, and NBR. Examples of the acrylic type organic viscoelastic body include acrylic polymers made mainly of an alkyl ester of acrylic acid or methacrylic acid. Examples of the acrylic polymer include the same as used for the adhesive agent layer.

As described above, the gel fraction of the organic viscoelastic body is preferably 40% or less. The organic viscoelastic body which has a weight-average molecular weight of 10,000 to 750,000, preferably 50,000 to 500,000 can express a preferable function as the intermediate layer. The weight-average molecular weight is measured by GPC.

As the material which forms the intermediate layer, these organic viscoelastic bodies may be used alone. A rubber type adhesive agent or acrylic type adhesive agent comprising one or more out of these organic viscoelastic bodies as a base polymer may also be used as an organic viscoelastic body. It is allowable to incorporate, into the adhesive agent, appropriate additives such as a crosslinking agent, a plasticizer, a filler, a pigment, and a tackifier if necessary, as same as an adhesive agent described below.

Examples of the material which forms the intermediate layer include thermoplastic resins such as SIS, SBS, SEBS, EMA and EEA. Of these thermoplastic resins, resins having a melting point of 70° C. or lower, which is measured by differential thermal analysis, are preferable, as described above. Furthermore, resins having an MRF of 5 g/min. (JIS K6730) or more are preferable.

The thickness of the intermediate layer is appropriately decided dependently on the kind of the base film or the adhesive agent layer, and is usually from 5 to 250 µm, preferably from 10 to 150 µm.

As the adhesive agent which constitutes the adhesive agent layer, for example, a pressure-sensitive adhesive agent which is ordinarily used can be used. Examples thereof include acrylic type adhesive agents, rubber type adhesive agents, and silicone type adhesive agents. Of these examples, the acrylic type adhesive agents, which comprise an acrylic polymer as a base polymer, is preferably used from the viewpoints of the heat resistance, resistance against stains onto an object to be adhered, and multiusability thereof in the case that the semiconductor wafer adhered to the re-peelable pressure-sensitive adhesive sheet undergoes a heating step.

Examples of the acrylic polymer include acrylic polymers comprising, as a monomer component, one or more selected from the following: (meth)acrylic acid alkyl esters (for example, the esters of alkyl groups having 1 to 30 carbon atoms, in particular, normal or branched alkyls having 4 to 18 carbon atoms, such as methyl ester, ethyl ester, propyl ester, isopropyl ester, butyl ester, isobutyl ester, s-butyl ester, t-butyl ester, pentyl ester, isopentyl ester, hexyl ester, heptyl ester, octyl ester, 2-ethylhexyl ester, isooctyl ester, nonyl ester, decyl ester, isodecyl ester, undecyl ester, dodecyl ester, tridecyl ester, tetradecyl ester, hexadecyl ester, octadecyl ester, and eicosyl ester); and (meth)acrylic acid cycloalkyl esters (for example, cyclopentyl ester and cyclohexyl ester). The wording "(meth)acrylic acid ester" means acrylic acid ester and/or methacrylic acid ester. All of words including "(meth)" referred to in the present invention have equivalent meanings.

If necessary, the acrylic polymer may contain a unit corresponding to a different monomer component which can be copolymerized with the (meth)acrylic acid alkyl ester or cycloalkyl ester in order to improve the cohesive property, heat-resistance, and others. Examples of this monomer component include carboxyl-group-containing monomers such as acrylic acid, methacrylic acid, carboxyethyl (meth)acrylate, carboxypentyl (meth)acrylate, itaconic acid, maleic acid, fumaric acid, and crotonic acid; acid anhydride monomers such as maleic anhydride and itaconic anhydride; hydroxyl-group-containing monomers such as 2-hydroxyethyl(meth)acrylate, 2-hydroxylpropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and 4-hydroxymethylcyclohexyl methyl(meth)acrylate; sulfonic-acid-group-containing monomers such as styrenesulfonic acid, allylsulfonic acid, 2-(meth)acrylamide-2-methylpropanesulfonic acid, (meth)acrylamidepropanesulfonic acid, sulfopropyl(meth) acrylate, (meth)acryloyloxynaphthalenesulfonic acid; phosphoric-acid-group-containing monomers such as 2-hydroxyethylacryloyl phosphate; acrylamide; and acrylonitrile. One or more out of these copolymerizable monomer components may be used. The use amount of these copolymerizable monomers is preferably 40% or less by weight of all monomer components used.

If necessary, the acrylic polymer may contain, as a copolymerizing monomer component, a polyfunctional monomer or some other component in order to cause crosslinking. Examples of this polyfunctional monomer include hexanediol di(meth)acrylate, (poly)ethylene glycol di(meth) acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth) acrylate, dipentaerythritol hexa(meth)acrylate, epoxy(meth) acrylate, polyester(meth)acrylate, and urethane(meth) acrylate. One or more out of these polyfunctional monomers may be used. The use amount of the polyfunctional monomer is preferably 30% or less by weight of all monomer components used from the viewpoint of adhesive property and others.

The acrylic polymer is obtained by polymerizing a single monomer or a mixture of two or more monomers. The polymerization may be performed by any of solution polymerization, emulsification polymer, bulk polymerization, suspension polymerization, or the like. It is preferable that the content of low molecular weight materials in the adhesive agent layer is small in order to prevent the semiconductor wafer or the like from being polluted. In light of this point, the number-average molecular weight of the acrylic polymer is preferably 300,000 or more, more preferably from about 400,000 to 3,000,000.

An external crosslinking agent may be appropriately incorporated into the adhesive agent in order to heighten the number-average molecular weight of the acrylic polymer as the base polymer, or the like. A specific example of the method for attaining the external crosslinking is a method of adding the so-called crosslinking agent such as a polyisocyanate compound, an epoxy compound, an aziridine compound, or a melamine compound to the adhesive agent to cause crosslinking reaction. When the external crosslinking agent is used, the use amount thereof is appropriately decided dependently on balance between the agent and the base polymer to be crosslinked and the use purpose of the adhesive agent. In general, it is preferable to incorporate about 1 to 5 parts by weight of the external additive into 100 parts by weight of the base polymer. If necessary, it is allowable to incorporate, into the adhesive agent, known various additives besides the above-mentioned components. Examples of the additives include a tackifier, a plasticizer, a pigment, a filler, and an age resistor.

As the adhesive agent, a radial ray curable adhesive agent may be used. As the radial ray curable adhesive agent, the following may be used without any especial limitation: an agent which has a radial ray curable functional group such as a carbon-carbon double bond, and exhibits adhesiveness. The radial ray curable adhesive agent is desirably an agent having adhesiveness lowered by receiving an emitted radial ray (in particular, an ultraviolet ray).

An example of the radial ray curable adhesive agent is a radial ray curable adhesive agent of an addition type, wherein a radial ray curable monomer component or oligomer component is added to an ordinary adhesive agent. Examples of the ordinary adhesive agent are the same as described about the above-mentioned pressure-sensitive adhesive agents, for example, the acrylic type adhesive agents and the rubber type adhesive agents.

Examples of the added radial ray curable monomer component include urethane oligomer, urethane(meth)acrylate, trimethylolpropane tri(meth)acrylate, tetramethylolmethane tetra(meth)acrylate, pentaerythritol tri(meth)acrylate, pentaerythritol tatra(meth)acrylate, dipentaerythritol monohydroxypenta(meth)acrylate, dipentaerythritol hexa(meth)acrylate, and 1,4-butanediol di(meth)acrylate. Examples of the radial ray curable oligomer component include various oligomers such as urethane, polyether, polyester, polycarbonate, and polybutadiene oligomers. The oligomers which have a molecular weight in the range of about 100 to 30,000 are suitable. The blend amount of the radial ray curable monomer or oligomer component is, for example, from 5 to 500 parts by weight, preferably from 40 to 150 parts by weight based on 100 parts by weight of the base polymer made of the acrylic polymer which constitutes the adhesive agent, or the like.

The radial ray curable adhesive agent may be a radial ray curable adhesive agent of an inclusion type besides the above-mentioned addition type radial ray curable adhesive agent. This inclusion type agent comprises, as a base polymer, a polymer having a carbon-carbon double bond in a side chain thereof or the main chain thereof or at a terminal of the main chain thereof. This inclusion type radial ray curable adhesive agent does not need to contain any low molecular weight component, such as any oligomer component. In many cases, the adhesive agent does not contain any low molecular weight component. Therefore, it does not happen that any oligomer component or the like shifts in the adhesive agent with the passage of time. Thus, an adhesive agent layer having a stable structure can be favorably formed.

As the above-mentioned base polymer, which has a carbon-carbon double bond, a polymer having a carbon-carbon double bond and further having adhesiveness can be used without any especial limitation. This base polymer is preferably a polymer having, as its base skeleton, an acrylic polymer. Examples of the base skeleton of the acrylic polymer are the acrylic polymers exemplified above.

The method for introducing a carbon-carbon double bond into the above-mentioned acrylic polymer is not particularly limited. Various methods can be adopted. The method for introducing the carbon-carbon double bond into a side chain of the polymer makes the design of the molecule thereof easy. An example of the method is a method of copolymerizing a monomer having a functional group with the acrylic polymer in advance, and subsequently causing the resultant to condensation-react or addition-react with a compound having a functional group reactive with the above-mentioned functional group and a carbon-carbon double bond while keeping the radial ray curability of the carbon-carbon double bond.

Examples of the combination of these functional groups include a carboxylic acid group and an epoxy group, a carboxylic acid group and an aziridyl group, and a hydroxyl group and an isocyanate group. Of these combinations, the combination of a hydroxyl group and an isocyanate group is preferable since the reaction thereof can easily be traced. If the combination of these functional groups is a combination which can generate the above-mentioned acrylic polymer having the carbon-carbon double bond, one of the functional groups and the other may be present in any one of the acrylic polymer and the above-mentioned compound and in the other, respectively. About the above-mentioned preferable combination, the case that the acrylic polymer has a hydroxyl group and the above-mentioned compound has an isocyanate group is preferred. In this case, examples of the isocyanate compound having a carbon-carbon double bond include methacryloylisocyanate, 2-methacryloyloxyethylisocyanate, and m-isopropenyl-α,α-dimethylbenzylisocyanate. Examples of the acrylic polymer include acrylic polymers wherein the hydroxyl-group-containing monomer exemplified above, or an ether compound such as 2-hydroxyethyl vinyl ether, 4-hydroxybutyl vinyl ether or diethylene glycol monovinyl ether is copolymerized.

As the above-mentioned inclusion type radial ray curable adhesive agent, the above-mentioned base polymer having a carbon-carbon double bond (in particular, the acrylic polymer) may be used alone. It is allowable to compound the above-mentioned radial ray curable monomer component or oligomer component with the base polymer to such an extent that the property of the base polymer is not deteriorated. The amount of the radial ray curable oligomer component or the like is usually from 0 to 30 parts by weight, preferably from 0 to 10 parts by weight based on 100 parts by weight of the base polymer.

In the case that the radial ray curable adhesive agent is cured with ultraviolet rays or the like, a photopolymerization initiator is incorporated into the agent. Examples of the photopolymerization initiator include α-ketol based compounds such as 4-(2-hydroxyethoxy)phenyl(2-hydroxy-2-propyl) ketone, α-hydroxy-α,α'-dimethylacetophenone, 2-methyl-2-hydroxypropiophenone, and 1-hydroxycyclohexyl phenyl ketone; acetophenone based compounds such as methoxyacetophenone, 2,2-dimethoxy-2-phenylacetophenone, 2,2-diethoxyacetophenone, and 2-methyl-1-[4-(methylthio)-phenyl]-2-morpholinopropane-1; benzoin ether based compounds such as benzoin ethyl ether, benzoin isopropyl ether, and anisoin methyl ether; ketal based compounds such as benzyl dimethyl ketal; aromatic sulfonyl chloride based compounds such as 2-naphthalenesulfonyl chloride; optically active oxime based compounds such as 1-phenone-1,1-propanedione-2-(o-ethoxycarbonyl)oxime; benzophenone based compounds such as benzophenone, benzoylbenzoic acid, and 3,3'-dimethyl-4-methoxybenzophenone; thioxanthone based compounds such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, and 2,4-diisopropylthioxanthone; camphor quinone; halogenated ketones; acylphosphinoxide; and acylphosphonate. The blend amount of the photopolymerization initiator is, for example, from about 0.1 to 10 parts by weight, preferably from about 0.5 to 5 parts by weight based on 100 parts by weight of the base polymer made of the acrylic polymer which constitutes the adhesive agent, or the like.

The thickness of the adhesive agent layer may be appropriately decided, and is from 1 to 500 μm, preferably from 3 to 250 μm from the viewpoint of, in particular, the workability of the film for cutting or other works.

The adhesive force of the adhesive agent layer is appropriately decided in accordance with the use purpose thereof or the like. The adhesive force (i.e., the 180° peel value at 25° C. and a peel rate of 300 mm/min.) is generally from 0.01 to 15 N/25-mm tape width, preferably from 0.05 to 10 N/25-mm tape width or more from the viewpoint of the adhesiveness to a wafer, peelability from a wafer, and others. In the case of the radial ray curable adhesive agent, the adhesive force after the agent receives radiated energy rays is preferably 0.5 N/25-mm tape width or less.

In the case of using the radial ray curable adhesive agent, it is allowable dependently on use conditions thereof or the blend composition thereof to radiate radial rays onto the agent before the agent is adhered to an object, thereby making the adhesive force thereof low, and then adhere them to each other in the state that the adhesive force is made low.

The re-peelable pressure-sensitive adhesive sheet of the present invention can be produced, for example, by forming an intermediate layer on a surface of a base film, applying an adhesive agent onto the surface of the intermediate layer to form an adhesive agent layer 13, and optionally adhering a separator onto the surface of this adhesive agent layer. Separately, an adhesive agent layer and an intermediate layer can be formed on a base film by forming the adhesive agent layer and the intermediate layer on a separator, and transferring them. Each of the intermediate layer and the adhesive agent layer may be a monolayer or a multi-layer having two or more layers.

The re-peelable pressure-sensitive adhesive sheet may have any shape in accordance with the use purpose thereof. When the use purpose of the sheet is, for example, for grinding a wafer, it is preferable that the sheet is beforehand cut and worked into the same shape as the wafer.

The separator protects the adhesive agent layer until the re-peelable pressure-sensitive adhesive sheet is put to practical use. The separator also functions not only to prevent foreign substances from adhering onto the adhesive agent layer but also to support the sheet. Examples of the material which constitutes the separator include paper; synthetic resin films such as polyethylene, polypropylene, and polyethylene terephthalate films. In order to heighten the peelability of the separator from the adhesive agent layer, the surface of the separator may be subjected to peeling treatment with silicone, a long-chain alkyl, fluorine, molybdenum sulfide or the like as the occasion demands. The following may be used: a low-adhesiveness substrate made of a fluorine-contained polymer such as polytetrafluoroethylene, polychlorotrifluoroethylene, polyvinyl fluoride, polyvinylidene fluoride, tetrafluoroethylene-hexafluoropropylene copolymer, chlorotrifluoroethylene-vinylidene fluoride copolymer, or a low-adhesiveness substrate made of a nonpolar polymer such as polyethylene or polypropylene. The thickness of the separator is usually from about 10 to 200 μm, preferably from about 25 to 100 μm.

The re-peelable pressure-sensitive adhesive sheet of the present invention is used, for example, as a protective sheet for a semiconductor wafer in the usual way. The adhesion of the protective sheet on a patterned surface of the semiconductor wafer is carried out by putting the semiconductor wafer onto a table so as to direct the patterned surface upwards, putting the adhesive agent layer of the protective sheet onto the patterned surface, and then pressing the resultant with pressing means such as compressing rollers. The protective sheet may be adhered onto the wafer by putting the semiconductor wafer and the protective sheet onto each other in a pressurizable container (such as an autoclave) as described above, and then pressurizing the inside of the container. At this time, the adhesion may be performed while the semiconductor wafer and the protective sheet are pressed with pressing means. The same adhesion as described above may be performed in a vacuum chamber. The method for the adhesion is not limited to these methods. When the adhesion is performed, the semiconductor wafer and the protective sheet may be heated.

As the thinning working of the semiconductor wafer, an ordinary method can be adopted. The machine for the thinning working may be a grinder (back grinder), a CMP pad, or the like. The thinning working is performed until the semiconductor wafer has a desired thickness. After the thinning working, the protective sheet is peeled. In the case that a radial ray curable adhesive agent, the adhesive force of which is lowered by receiving a radiated radial ray, is used as the adhesive agent layer of the protective sheet, the radial ray is radiated onto the protective sheet to lower the adhesive force thereof and subsequently the sheet is peeled. The manner for radiating the radial ray is not particularly limited. For example, the manner may be a manner of radiating ultraviolet rays.

The present invention is described in more detail by way of the following examples. However, the present invention is not limited to these examples.

(Storage Elastic Modulus)

The storage elastic modulus is a value obtained by using a viscoelastic spectrometer (frequency: 1 Hz, sample thickness: 2 mm, and compression load: 100 g), manufactured by RHEOMETRIC SCIENCE, INC., to measure a material which forms an intermediate layer at each of two measuring temperatures (23° C. and 200° C.).

(Gel Fraction)

The gel fraction is a value obtained by immersing a material which forms an intermediate layer (weight: W1 (g)) in 100 g of ethyl acetate at 23° C. for 168 hours, drying the material, obtaining the weight (W2 (g)) of the dried material, and then calculating the following equation: {(W1−W2)/W1}×100 (%).

(Heating Contraction Percentage)

The heating contraction percentage is a value obtained by placing a film having a size of 20 mm×150 mm (before heating treatment) in an oven at 200° C. for 2 hours, allowing the film to stand still at room temperature (23° C.), obtaining the size of the film the temperature of which is returned to the room temperature (the size of the film after the heating treatment), and then calculating an equation described below. In the measurement, the sizes along the MD and the TD are set to 150 mm and 20 mm, respectively, for MD measurement, and the sizes along the MD and the TD are set to 20 mm and 150 mm, respectively, for TD measurement. In short, the size along the direction for the measurement is made longer.

Heating contraction percentage (%)={(Size before heating treatment−Size after heating treatment)/(Size before heating treatment)}×100

EXAMPLE 1

(Formation of an Intermediate Layer)

As a base film, a polyethylene naphthalate film of 25 μm thickness (trade name: Teonex TM-Q83, manufactured by Teijin Du Pont Films Japan Ltd.) was used. The heating contraction percentage of this film was 0.90%. The glass transition temperature and the melting point thereof were 121° C. and 269° C., respectively.

A 40% by weight solution of polyisobutylene (gel fraction: 30% by weight) having a weight-average molecular weight of 70,000 in toluene was applied onto the base film, and then dried to form a polyisobutylene intermediate layer of 80 μm thickness.

The storage elastic modulus (G') of the polyisobutylene intermediate layer was $5.5 \times 10^4$ Pa at 23° C. and $1.1 \times 10^3$ Pa at 200° C.

(Formation of a Re-Peelable Pressure-Sensitive Adhesive Sheet)

Eighty five parts by weight of butyl acrylate, 15 parts by weight of ethyl acrylate, 5 parts by weight of acrylic acid and 2 parts by weight of 2-hydroxyethyl acrylate were copolymerized to prepare a 30% by weight solution of an acrylic polymer having an average-weight molecular weight of 800,000 in toluene. The following were blended with 100 parts by weight of solids in the acrylic polymer solution, so as to prepare an acrylic type adhesive agent solution: 0.5 part by weight of an epoxy type crosslinking agent (TETRAD-C, manufactured by Mitsubishi Gas Chemical Co., Inc.), and 3 parts by weight of an isocyanate type crosslinking agent (Coronate L, manufactured by Nippon Polyurethane Industry Co., Ltd.). This acrylic type adhesive agent solution was applied onto a polyester separator (trade name: Cerapeel BNA(S), manufactured by Toyo Metallizing Co., Ltd.), and then dried to form an acrylic type adhesive agent layer of 20 μm thickness. This acrylic type adhesive agent layer was transferred onto the polyisobutylene intermediate layer to form a re-peelable pressure-sensitive adhesive sheet.

EXAMPLE 2

(Formation of an Intermediate Layer)

One hundred parts by weight of 2-ethylhexyl acrylate and 2.5 parts by weight of acrylic acid were copolymerized to prepare a 40% by weight solution of an acrylic polymer (gel fraction: 30% by weight) having an average-weight molecular weight of 400,000 in toluene. The following was blended with 100 parts by weight of solids in the acrylic polymer solution, so as to prepare an acrylic type adhesive agent solution: 0.03 part by weight of an epoxy type crosslinking agent (TETRAD C, manufactured by Mitsubishi Gas Chemical Co., Inc.). An acrylic intermediate layer was formed in the same manner as that of Example 1 except that the acrylic type adhesive agent solution prepared herein was used instead of the adhesive agent solution.

The storage elastic modulus (G') of the acrylic intermediate layer was $3.4 \times 10^6$ Pa at 23° C. and $8.3 \times 10^3$ Pa at 200° C.

(Formation of a Re-Peelable Pressure-Sensitive Adhesive Sheet)

In the same manner as that of Example 1, the same acrylic type adhesive agent layer was transferred onto the acrylic intermediate layer formed herein, so as to form a re-peelable pressure-sensitive adhesive sheet.

EXAMPLE 3

(Formation of an Intermediate Layer)

As a base film, a polyethylene terephthalate film (trade name: S-105, manufactured by Toray Industries, Inc.) of 25 μm thickness was used. The heating contraction percentage of this film was 2.0%. The glass transition temperature and the melting point thereof were 120° C. and 258° C., respectively.

Onto this base film was applied the acrylic type adhesive agent solution prepared in Example 2, and then the solution was dried to form an acrylic intermediate layer of 80 μm thickness.

(Formation of a Re-Peelable Pressure-Sensitive Adhesive Sheet)

In the same manner as that of Example 1, the same acrylic type adhesive agent layer was transferred onto the acrylic intermediate layer formed herein, so as to form a re-peelable pressure-sensitive adhesive sheet.

EXAMPLE 4

(Formation of an Intermediate Layer)

As a base film, a polyimide film (trade name: APICAL 50HP, manufactured by Kaneka Corp.) of 25 μm thickness was used. This film had a heating contraction percentage of 0.1%, and a glass transition temperature of 400° C., but had no melting point.

Onto this base film was applied the acrylic type adhesive agent solution prepared in Example 2, and then the solution was dried to form an acrylic intermediate layer of 80 μm thickness.

(Formation of a Re-Peelable Pressure-Sensitive Adhesive Sheet)

In the same manner as that of Example 1, the same acrylic type adhesive agent layer was transferred onto the acrylic intermediate layer formed herein, so as to form a re-peelable pressure-sensitive adhesive sheet.

EXAMPLE 5

(Formation of an Adhesive Agent)

Seventy five parts by weight of 2-ethylhexyl acrylate, 25 parts by weight of acryloylmorpholine, and 7 parts by weight of 2-hydroxyethyl acrylate were copolymerized to prepare a 35% by weight solution of an acrylic polymer having an average-weight molecular weight of 600,000 in toluene. Methacryloyloxyethylene isocyanate was added to the acrylic polymer in such a manner that 0.8 equivalent of the methacryloyloxyethylene isocyanate was used per equivalent of the hydroxyl group of the 2-hydroxyethyl acrylate of the acrylic polymer, thereby preparing an ultraviolet curable acrylic polymer. Into 100 parts by weight of the ultraviolet curable acrylic polymer were incorporated 0.8 part by weight of an isocyanate type crosslinking agent (Coronate L, manufactured by Nippon Polyurethane Industry Co., Ltd.) and 1.5 parts by weight of a photoreaction initiator (IRGACURE 651, manufactured by Ciba Specialty Chemicals Inc.), thereby preparing an ultraviolet curable acrylic adhesive agent.

(Formation of a Re-Peelable Pressure-Sensitive Adhesive Sheet)

The ultraviolet curable acrylic adhesive agent was applied onto a polyester separator (trade name: Cerapeel BNA(S), manufactured by Toyo Metallizing Co., Ltd.), and then dried to form an ultraviolet curable adhesive agent layer of 20 μm thickness. This ultraviolet curable adhesive agent layer was transferred onto the acrylic intermediate layer as formed in Example 2, so as to produce a re-peelable pressure-sensitive adhesive sheet. An ultraviolet ray radiating device (NEL UM-110, manufactured by Nitto Seiki Inc.) was used to radiate ultraviolet rays (totalized amount of radiated ultraviolet rays: 500 mJ/cm$^2$) onto this pressure-sensitive adhesive sheet from its separator side, and then the sheet was used.

COMPARATIVE EXAMPLE 1

A re-peelable pressure-sensitive adhesive sheet was produced in the same manner as that of Example 1 except that no polyisobutylene intermediate layer was formed.

COMPARATIVE EXAMPLE 2

A re-peelable pressure-sensitive adhesive sheet was produced in the same manner as that of Example 2 except that no acrylic intermediate layer intermediate layer was formed.

COMPARATIVE EXAMPLE 3

A re-peelable pressure-sensitive adhesive sheet was produced in the same manner as that of Example 3 except that no acrylic intermediate layer intermediate layer was formed.

COMPARATIVE EXAMPLE 4

A re-peelable pressure-sensitive adhesive sheet was produced in the same manner as that of Example 4 except that no acrylic intermediate layer intermediate layer was formed.

COMPARATIVE EXAMPLE 5

A re-peelable pressure-sensitive adhesive sheet was produced in the same manner as that of Example 5 except that no acrylic intermediate layer intermediate layer was formed.

COMPARATIVE EXAMPLE 6

(Formation of an Intermediate Layer) Thirty parts by weight of 2-ethylhexyl acrylate, 70 parts by weight of methyl acrylate and 10 parts by weight of acrylic acid were copolymerized to prepare a 30% by weight solution of an acrylic polymer having an average-weight molecular weight of 1,200,000 in ethyl acetate. Into 100 parts by weight of solids in the acrylic polymer solution were incorporated 2.0 parts by weight of an epoxy type crosslinking agent (TETRAD-C, manufactured by Mitsubishi Gas Chemical Co., Inc.), thereby preparing an acrylic adhesive agent solution. The acrylic adhesive agent solution was applied onto the same base film as used in Example 1, and dried to form an intermediate layer of 50 µm thickness.

The storage elastic modulus (G') of the acrylic intermediate layer was $5.8 \times 10^6$ Pa at 23° C. and $1.2 \times 10^5$ Pa at 200° C.

(Formation of a Re-Peelable Pressure-Sensitive Adhesive Sheet)

In the same manner as that of Example 1, the same acrylic type adhesive agent layer was transferred onto the acrylic intermediate layer formed herein, so as to form a re-peelable pressure-sensitive adhesive sheet.

(Evaluating Method)

A laminating device (DR-8500II, manufactured by Nitto Seiki Inc.) was used to laminate or adhere each of the re-peelable pressure-sensitive adhesive sheets obtained in the Examples and the Comparative Examples onto an 8-inch silicon wafer (thickness: 750 µm), and then a grinding device (DFG-840, manufactured by Disco Corp.) was used to grind the wafer into a thickness of 100 µm. The resultant laminate was placed onto a horizontal plate to direct the wafer downwards and the sheet upwards, and then a digital microscope (VH-6300, manufactured by Keyence Corp.) was used to measure the raised amount of the outermost circumferential portion of the wafer from the center of the wafer regarded as an original point. This raised amount was defined as the warp amount (mm) of the wafer after the grinding. Thereafter, the ground wafer onto which the re-peelable pressure-sensitive adhesive sheet was adhered was heated on a hot plate at 180° C. for 2 minutes, and then cooled naturally. The raised amount of the outermost circumferential portion of the wafer after the cooling was measured in the same manner as described above. This was defined as the warp amount (mm) of the wafer after the heating. The results are shown in Table 1.

TABLE 1

|  | Warp amount (mm) after the grinding | Warp amount (mm) after the heating |
| --- | --- | --- |
| Example 1 | 0.8 | 6.3 |
| Example 2 | 0.9 | 2.3 |
| Example 3 | 1.2 | 7.4 |
| Example 4 | 1.0 | 1.8 |
| Example 5 | 1.0 | 2.0 |
| Comparative Example 1 | 6.3 | 24.5 |
| Comparative Example 2 | 5.8 | 20.6 |
| Comparative Example 3 | 6.0 | Wafer cracked |
| Comparative Example 4 | 5.4 | 15.4 |
| Comparative Example 5 | 6.8 | 22.7 |
| Comparative Example 6 | 4.5 | 19.3 |

If a wafer has a warp amount of 10 mm, the wafer can be received in an ordinary wafer-carrying cassette. This is used as a standard. Warp amounts of less than 10 mm can be judged to be good, and warp amounts of 10 mm or more can be judged to be bad. In all of the Examples and Comparative Examples, the warp amounts of the grinding were good. However, in the Comparative Examples, the warp amounts after the grinding were larger than those in the Examples. In the Examples, the warp amounts after the heating were good. In contrast, in all of the Comparative Examples, however, the warp amounts of the heating, which were over 15 mm, were bad, and one of the wafers was cracked after the heating.

The specific embodiments or examples described in the item "DESCRIPTION OF THE EMBODIMENTS" are merely embodiments or examples made the technical contents of the present invention evident. Thus, the present invention should not be limited to such specific examples, and should not be interpreted in a narrow sense. The present invention can be modified into various manners within the scope of the sprit of the present invention and the following claims.

What is claimed is:

1. A re-peelable pressure-sensitive adhesive sheet, comprising an adhesive layer formed over a base film and at least one intermediate layer between the base film and the adhesive layer,
    wherein the intermediate layer comprises materials which have a function of relieving thermal contraction stress generated under 100-200° C. heat treatment, wherein said material is a viscoelastic sheet or a thermoplastic resin,
    wherein said intermediate layer comprises polyisobutylene;
    wherein, the intermediate layer has a storage elastic modulus (G') of $3.0 \times 10^4$ to $1.0 \times 10^8$ Pa at 23° C. at the intermediate layer and a storage elastic modulus (G') of $1.0 \times 10^3$ to $8.0 \times 10^4$ Pa at 200° C. at the intermediate layer, and
    wherein the base film has a heat shrinkage ratio, in both MD and TD directions, of less than 2% at 200° C. heat treatment for 2 hours.

2. The re-peelable pressure-sensitive adhesive sheet according to claim 1, wherein the gel fraction of the viscoelastic sheet is 40% or less by weight.

3. The re-peelable pressure-sensitive adhesive sheet according to claim 1, wherein the intermediate layer comprises a thermoplastic resin.

4. The re-peelable pressure-sensitive adhesive sheet according to claim 3, wherein the melting point of the thermoplastic resin is 70° C. or lower.

5. The re-peelable pressure-sensitive adhesive sheet according to claim 1, wherein the base film is a film made of a material having a glass transition temperature (Tg) of 70° C. or higher and a melting point of 200° C. or higher.

6. A process for producing a semiconductor element, comprising the steps of selecting a material which forms an intermediate layer on the basis of the storage elastic modulus (G') properties of the material being $3.0 \times 10^4$ to $1.0 \times 10^8$ Pa at 23° C. and $1.0 \times 10^3$ to $8.0 \times 10^4$ Pa at 200° C., adhering a re-peelable pressure-sensitive adhesive sheet which comprises an adhesive layer formed over a base film and the intermediate layer between the base film and the adhesive layer, to a semiconductor wafer, wherein, the intermediate layer having a storage elastic modulus (G') of $3.0 \times 10^4$ to $1.0 \times 10^4$ to $1.0 \times 10^8$ Pa at 23° C. and a storage elastic modulus (G') of $1.0 \times 10^3$ to $8.0 \times 10^4$ Pa at 200° C., and then, wafer thinning and wafer cutting the semiconductor wafer in the adhered state.

7. The re-peelable pressure-sensitive adhesive sheet of claim 2, wherein the gel fraction ranges from 10% to 40%.

8. The re-peelable pressure-sensitive adhesive sheet of 7, wherein the gel fraction ranges from 20% to 30%.

9. The re-peelable pressure-sensitive adhesive sheet of claim 1, wherein the weight-average molecular weight of the viscoelastic sheet is from 10,000 to 750,000.

10. The re-peelable pressure-sensitive adhesive sheet of claim 1, wherein the weight-average molecular weight of the viscoelastic sheet is from 50,000 to 500,000.

11. The re-peelable pressure-sensitive adhesive sheet of claim 1, further comprising a separator on the surface of the adhesive layer.

12. The re-peelable pressure-sensitive adhesive sheet of claim 1, wherein the adhesive layer comprises an external cross linking agent.

13. The re-peelable pressure-sensitive adhesive sheet of claim 1, wherein the thickness of the intermediate layer is greater than 50 μm but less than 150 μm.

* * * * *

UNITED STATES PATENT AND TRADEMARK OFFICE
CERTIFICATE OF CORRECTION

PATENT NO. : 7,514,143 B2  Page 1 of 1
APPLICATION NO. : 10/912615
DATED : April 7, 2009
INVENTOR(S) : Takeshi Matsumura et al.

It is certified that error appears in the above-identified patent and that said Letters Patent is hereby corrected as shown below:

At Column 1, Line 44, delete "the a" and insert --the--, therefor.

At Column 7, Line 17, delete "tatra(meth)acrylate" and insert --tetra(meth)acrylate--, therefor.

At Column 7, Line 64, delete "aziridyl" and insert --aziridinyl--, therefor.

At Column 13, Line 28, delete "(Formation of an Intermediate Layer)" and insert the same on Column 13, Line 26, as a sub-heading below "COMPARATIVE EXAMPLE 6".

At Column 15, Line 10, in Claim 6, after "material", insert --comprising polyisobutylene--.

At Column 15, Line 15, in Claim 6, delete "film" and insert --film, wherein the base film has a heat shrinkage ratio, in both MD and TD directions, of less than 2% at 200°C. heat treatment for 2 hours--, therefor.

At Column 15, Line 17, in Claim 6, after "$3.0 \times 10^4$", delete "to $1.0 \times 10^4$".

At Column 15, Line 19, in Claim 6, delete "C. ," and insert --C.,--, therefor.

At Column 16, Line 3, in Claim 8, after "of", insert --claim--.

At Column 16, Line 16, in Claim 12, delete "cross linking" and insert --crosslinking--, therefor.

Signed and Sealed this

Twenty-third Day of February, 2010

David J. Kappos
*Director of the United States Patent and Trademark Office*